(12) United States Patent
Darden et al.

(10) Patent No.: US 6,981,335 B1
(45) Date of Patent: Jan. 3, 2006

(54) DIESEL FUEL GAUGE

(76) Inventors: Danny E. Darden, 3242 Fox Rd., Millsap, TX (US) 76066; Warren Vilmaire, 12557 High Meadow Dr., Dallas, TX (US) 75244; Bret R Blades, 3213 Rinehart, Grand Prairie, TX (US) 75050

( * ) Notice: Subject to any disclaimer, the term of this patent is extended or adjusted under 35 U.S.C. 154(b) by 292 days.

(21) Appl. No.: 10/611,085

(22) Filed: Jul. 1, 2003

(51) Int. Cl.
    *G01F 23/04* (2006.01)
(52) U.S. Cl. ................................................ 33/722
(58) Field of Classification Search ............... 33/722; 33/ 73/290 R
    See application file for complete search history.

(56) References Cited

U.S. PATENT DOCUMENTS

| | | | |
|---|---|---|---|
| 1,866,743 A | * | 7/1932 | Abbott .................... 106/217.8 |
| 3,850,416 A | * | 11/1974 | Jackson ...................... 33/701 |
| 4,214,368 A | * | 7/1980 | Peterson ..................... 33/701 |
| 5,880,375 A | | 3/1999 | Bielski et al. |

* cited by examiner

*Primary Examiner*—Hezron Williams
*Assistant Examiner*—Paul M. West
(74) *Attorney, Agent, or Firm*—Geoffrey A. Mantooth; Arthur F. Zobal

(57) ABSTRACT

The diesel fuel gauge is used for determining the level of diesel fuel in a diesel fuel tank. The gauge is in the form of an elongated member formed of white plastic material with spaced apart marks and numbers formed on one side of a gauge portion with a handle extending from the gauge portion. A dry layer of material soluble in diesel fuel coats the side of the gauge covering the marks and numbers. The material in one embodiment includes asphalt mixed with a liquid thinner and a liquid drying agent. When the gauge is inserted into the diesel fuel in the tank and removed, the material in contact with the diesel fuel may be removed from the member by wiping it off to expose the marks and numbers for use for determining the level of diesel fuel in the tank.

8 Claims, 3 Drawing Sheets

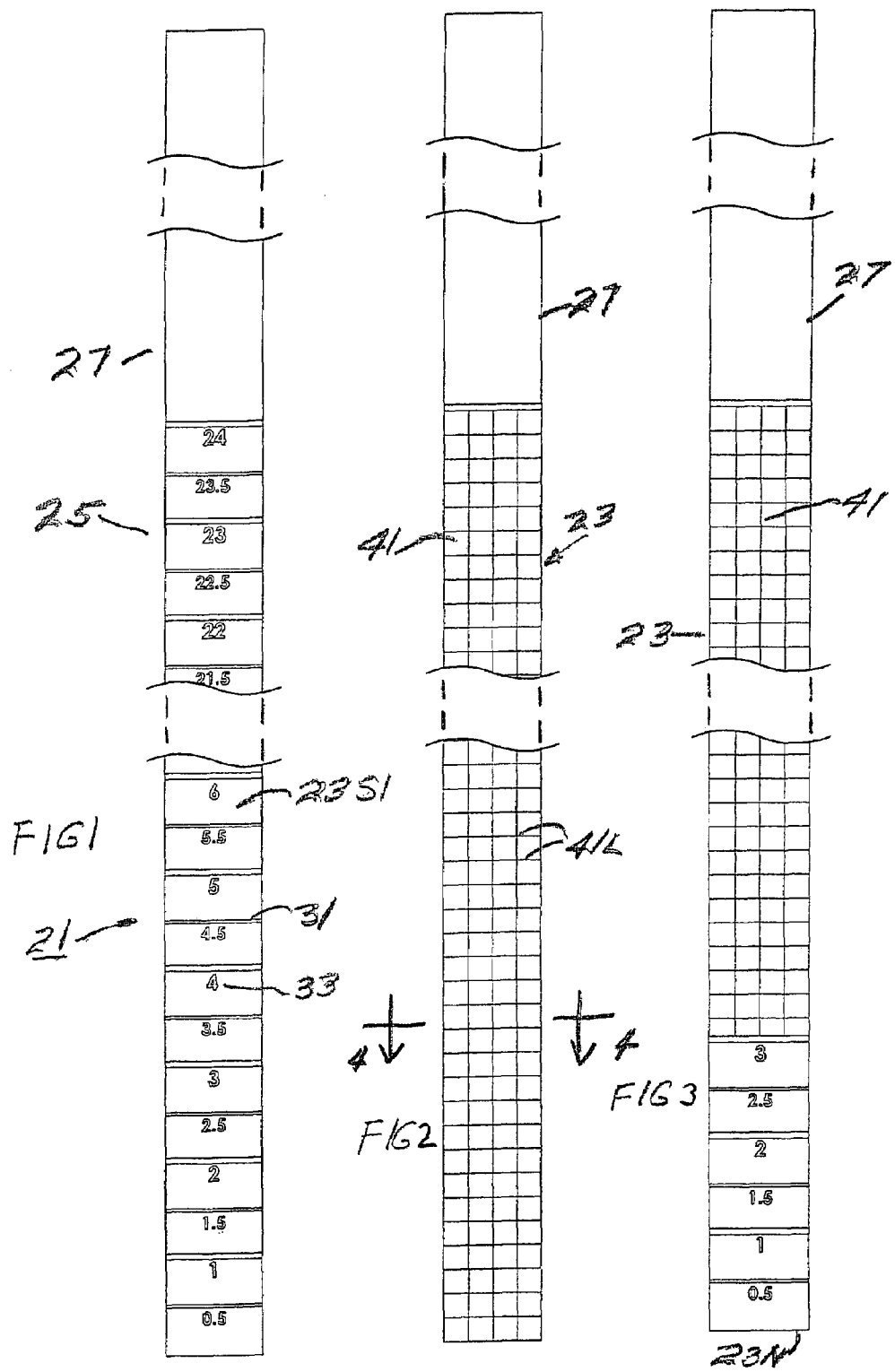

DIESEL FUEL GAUGE

BACKGROUND OF THE INVENTION

1. Field of the Invention

The invention relates to a fuel gauge for determining the level of diesel fuel in a fuel tank of a motor vehicle.

2. Description of the Prior Art

The fuel tanks of large diesel operated trucks hold about 150 gallons of diesel fuel. Since these trucks are driven for long periods of time at all times in a 24 hour period and since diesel fuel stations are not plentiful in many areas, it is important that the driver know the fuel level in the fuel tank.

Most diesel operated trucks have electronic fuel gauges which become ineffective after four or five years since the wax in the diesel fuel will eventually coat the electronic equipment and prevent it from functioning. A malfunction in the electronic fuel gauge may occur on the road which prevents the driver from knowing the fuel level in the fuel tank.

Diesel fuel used in trucks is nearly transparent and the conventional dip stick for determining the level of diesel fuel in the tank of a diesel truck is hard to read. One known dip stick changes color when located in a diesel fuel tank.

SUMMARY OF THE INVENTION

It is an object of the invention to provide a new and useful fuel gauge for determining the level of diesel fuel in a fuel tank which is effective, easy to use and inexpensive.

The fuel gauge comprises an elongated member having a coating of material thereon which is soluble in diesel fuel. In using the gauge, the member is inserted into the fuel tank to contact the material with diesel fuel. The member then is removed from the fuel tank. The material contacted by the diesel fuel is removed from the member to allow the user to determine the diesel fuel level in the fuel tank by observing the member upon removal of the coating of material from the member.

In a further aspect, indicia such as gauge marks are formed on one side of the member to allow the user to obtain an accurate reading of the diesel fuel level.

In a preferred embodiment, the coating is formed of asphalt mixed with a thinner to form a liquid which is applied to the member and then allowed to dry.

Preferably, the coating is characterized such that when the member is removed from the fuel tank, the coating contacted by the diesel fuel may be promptly wiped off of the member for reading purposes.

In a further aspect, the gauge member is formed of plastic.

BRIEF DESCRIPTION OF THE DRAWINGS

FIG. 1 illustrates the fuel gauge of the invention in an uncoated state.

FIG. 2 illustrates the fuel gauge of FIG. 1 with one side below the handle coated with a layer of material soluble in diesel fuel.

FIG. 3 illustrates the fuel gauge with a portion of the coating material wiped off.

In FIGS. 1–3, the fuel gauge is shown in broken sections due to its length.

DESCRIPTION OF THE PREFERRED EMBODIMENTS

Figure 7:
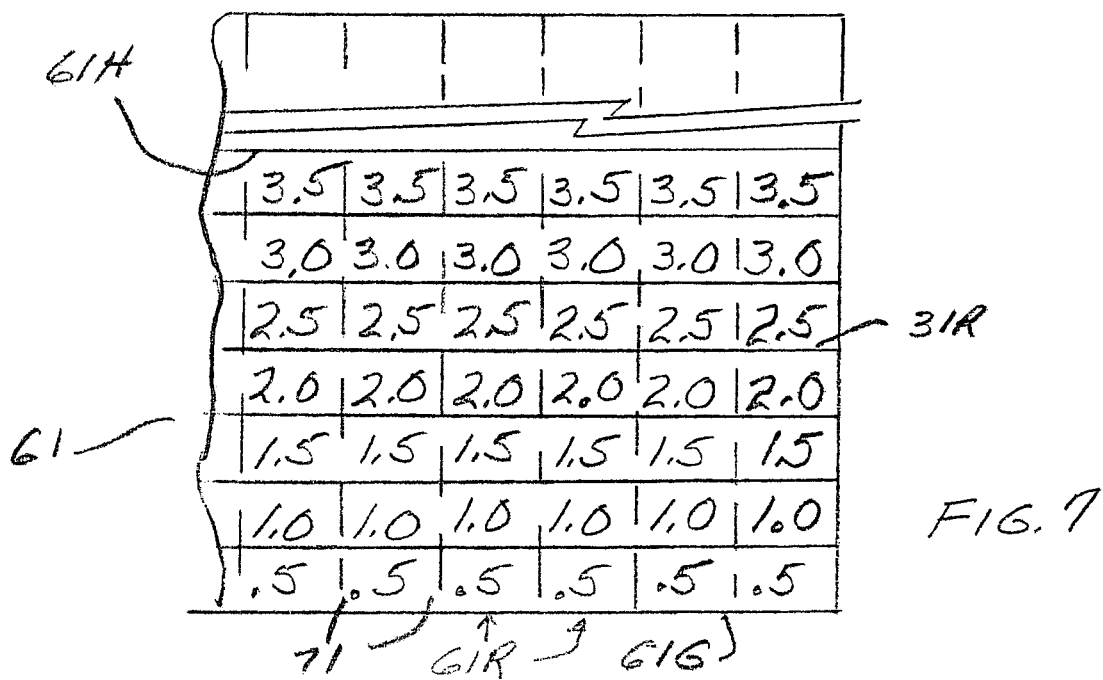
FIG. 7 illustrates a sheet of plastic from which the gauge members are formed.

Referring now to the drawings, the fuel gauge is identified at 21. It comprises an elongated member 23 and having a gauge portion 25 and a handle 27. The member 23 is rectangular in cross-section having sides 23S1, 23S2, 23S3, 23S4. The member 23 is formed of white flexible plastic such as polystyrene which is insoluble in diesel fuel. Spaced apart indicia comprising gauge marks 31 and numbers 33 are formed on the side 23S1 of the gauge portion 25.

A layer or coating of material 41 is deposited on the side 23S1 of the gauge portion 25 covering the marks 31 and numbers 33. The material 41 is characterized such that it is soluble in diesel fuel and will not contaminate the diesel fuel. In FIGS. 2 and 3, the layer 41 is depicted by the perpendicular crossed lines 41L, the outer surface of which is smooth.

In a preferred embodiment, the material 41 is formed from asphalt mixed with a thinner such as mineral or petroleum sprits and a drying agent such as naphtha. The three components are mixed together to form a thin liquid which is applied on the side 23S1 and allowed to dry to form a partially opaque gray layer 41 which covers the marks 31 and numbers 33.

In using the gauge 21, the operator holds the gauge 21 by way of the handle 27 and inserts the gauge portion 25 into the fuel tank 45 as far as it will go. If the gauge 21 is left in the diesel fuel 47 for a period of time, the layer 41 will be dissolved by the diesel fuel such that when it is removed from the fuel tank, the exposed marks 31 and numbers 33 will give a measurement as to the level of the diesel fuel in the fuel tank. A preferred way of using the gauge is to insert the gauge portion 25 into the diesel fuel tank and then promptly remove it from a fuel tank. This will cause the portion of the layer 41 which was in contact with the diesel fuel to be softened such that the operator can take a rag 51 and wipe the gauge portion which will cause only the softened portion of the layer to be wiped off to expose the marks 31 and numbers 33 under the removed layer to allow a determination to be made of the level of the diesel fuel in the fuel tank. In FIG. 3, the exposed marks and numbers are those shown at the six levels above the lower end 23N of the gauge.

Figure 8:
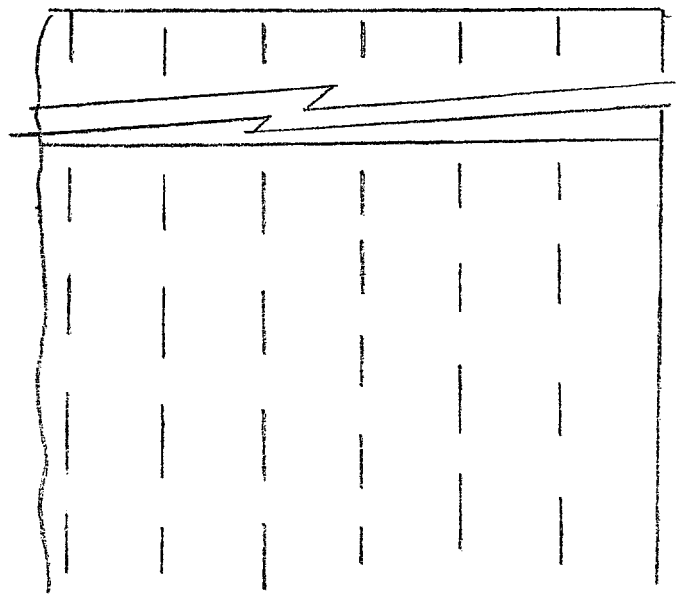
FIG. 8 illustrates the sheet of FIG. 7 coated with a layer of material soluble in diesel fuel from which a plurality of fuel gauge members are formed by cutting along the dotted lines.
Figure 4:
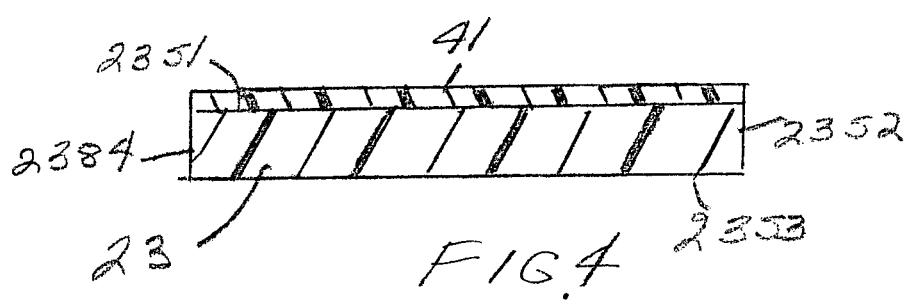
FIG. 4 is an enlarged cross-section of FIG. 2 as seen along lines 4—4 thereof.
Figure 5:
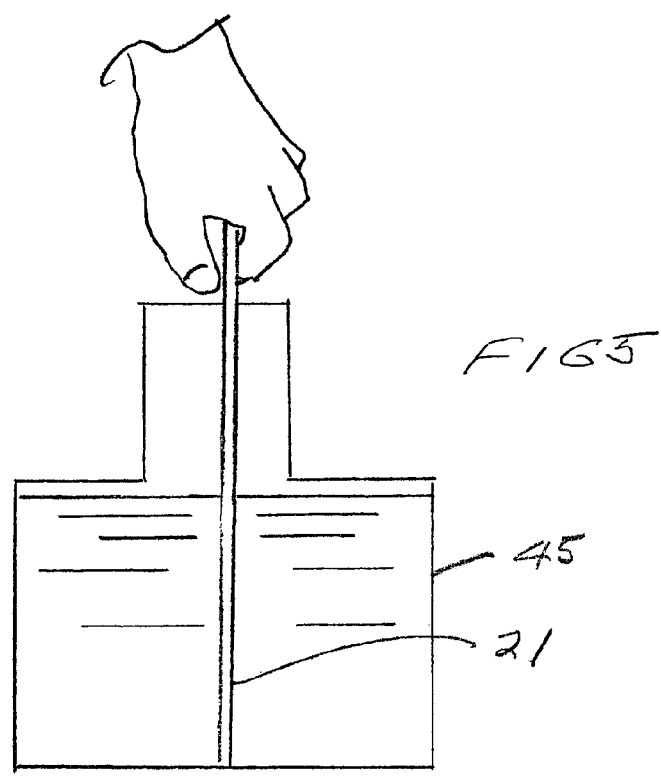
FIG. 5 illustrates the fuel gauge member inserted into the diesel fuel of a container which represents a diesel fuel tank.
Figure 6:
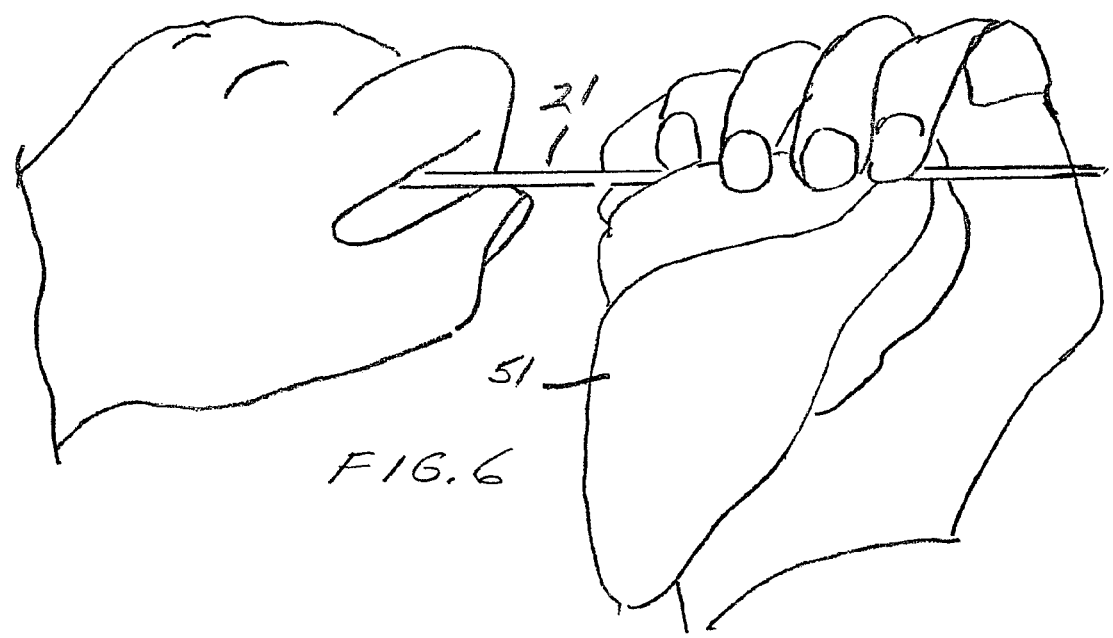
FIG. 6 illustrates the gauge member being wiped with a cloth after it has been removed from the fuel tank.

In a preferred embodiment, and referring to FIGS. 7 and 8, a plurality of gauges 23 are formed from a single square sheet 61 of polystyrene plastic having dimensions of 48"×48" and a thickness of 0.060". Each gauge 21 has dimensions of 1"×48"×0.060", however, these dimensions may vary.

Mark lines 31R are formed in spaced apart horizontal rows on the side 61S of the sheet 61. The horizontal lines 31R are spaced apart 0.5 of an inch beginning with the edge 61G to the level 61H. Numbers 33 are formed next to each line 31 in rows 61R. Beginning with edge 61G, the numbers 33 increase upward from 0.5, 1, 1.5, etc. to the level 61H. The lines 31R and numbers 33 are silk screened on the sheet 61 and cured with ultra violet light such that they are black and are unsoluble in diesel fuel. The material 41 then is spray painted on the sheet below the line 61H to cover the lines 31R and numbers 33 and allowed to dry. The sheet then is cut along dotted lines 71 to form a plurality of gauges 21. The portions below the level 61H are the gauge portions 25 and the portions above the level 61H are the handle portions.

Preferably two coats of the material are spray painted on the sheet to form a coating layer 0.0002–0.0005 of an inch thick. The coating is not opaque but covers the side 61S and the lines 31 and numbers. For a finished gauge formed using the drying agent, the gauge may be inserted into and promptly removed from the diesel fuel tank and the coating contacted with diesel fuel promptly wiped off. More than two coating may be spray painted on the sheet, however, the gauge member will have to be located in the diesel fuel for a longer time for the coating to be wiped off.

Instead of using the drying agent naphtha another thinner such as kerosene may be used with the asphalt and mineral spirits, however the drying time is much longer.

After use, the fuel gauges 21 may be disposed of.

The asphalt may be of the type available commercially from Davis SS Roof Coatings of Shreveport, La. and identified as DA350. It is a thick flowable material comprising black asphalt and mineral spirits. We added additional mineral spirits as a thinner and naphtha which acts as a thinner and hastens the drying time. The material thus is thinned sufficient such that it may be spray painted on the sheet 61.

What is Claimed is:

1. A gauge for determining the level of diesel fuel in a fuel tank of a motor vehicle, comprising:
    an elongated member, adapted to be located into and removed from a fuel tank of a motor vehicle, said member formed of plastic;
    a dry layer of material coating a side of said member and which layer is soluble in diesel fuel such that upon insertion of said member into diesel fuel in a fuel tank the portion of said layer in contact with the diesel fuel is removable to allow a person to determine the level of diesel fuel in the tank upon removal of said member from the tank by observing said member.

2. The gauge of claim 1, wherein:
    said material comprises asphalt attached to said side of said member.

3. The gauge of claim 1, wherein said material is characterized such that when said member is inserted into diesel fuel and promptly removed, said material which was in contact with diesel fuel may be wiped off of said member.

4. A gauge for determining the level of diesel fuel in a fuel tank of a motor vehicle, comprising:
    an elongated member, adapted to be located into and removed from a fuel tank of a motor vehicle, said member formed of plastic;
    said elongated member having indicia on a side thereof,
    a dry layer of material coating said side of said member including said indicia and which layer is soluble in diesel fuel such that upon insertion of said member into diesel fuel in a fuel tank the portion of said layer in contact with the diesel fuel is removable exposing said indicia to allow a person to determine the level of diesel fuel in the tank upon removal of said member from the tank by observing said indicia exposed upon removal of said layer of material from said member.

5. The gauge of claim 4, wherein:
    said material comprises asphalt attached to said side of said member.

6. The gauge of claim 4, wherein said material is characterized such that when said member is inserted into diesel fuel and promptly removed, said material which was in contact with diesel fuel may be wiped off of said member.

7. The gauge of claim 4, wherein:
    said material will not contaminate diesel fuel.

8. A method of determining the level of diesel fuel in a fuel tank comprising the steps of:
    inserting into said fuel tank, an elongated member having indicia formed on a side thereof which is coated with a layer of material soluble in diesel fuel,
    removing said member from said fuel tank, and
    wiping off of said member, said layer of material which was in contact with diesel fuel in said tank to expose said indicia under said removed material.

* * * * *